Nov. 10, 1964     E. H. TALBERT     3,156,484
ELEVATING AND TRANSPORTING DEVICE
Filed Jan. 12, 1962
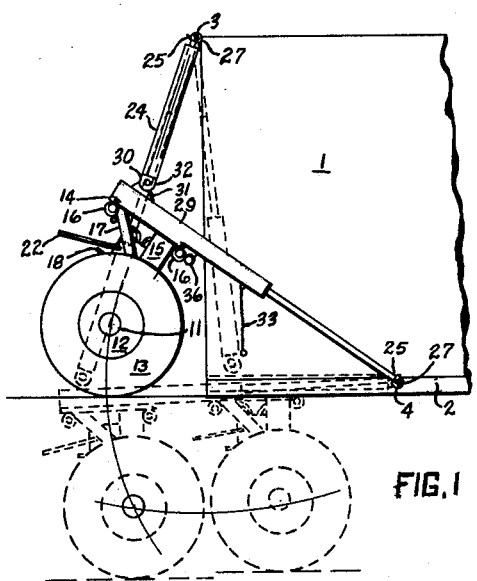
FIG. 1
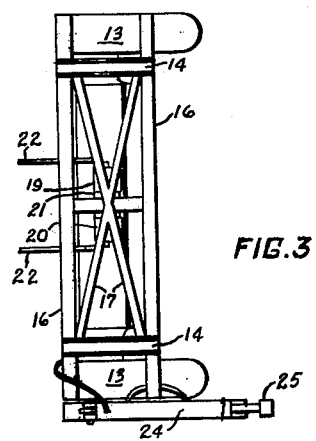
FIG. 3
FIG. 4
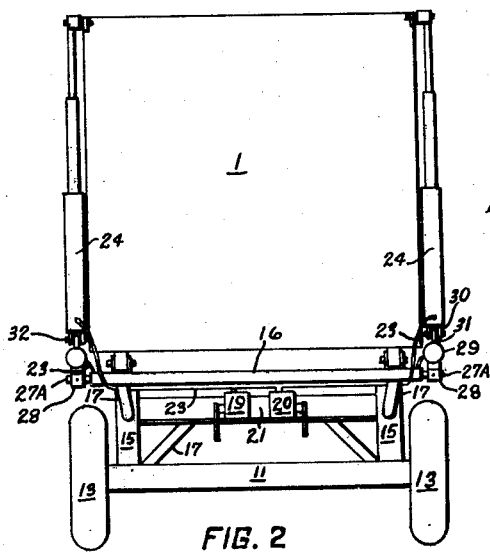
FIG. 2
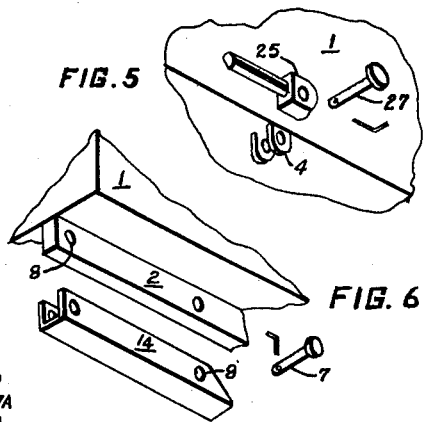
FIG. 5
FIG. 6
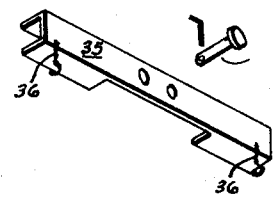
FIG. 8
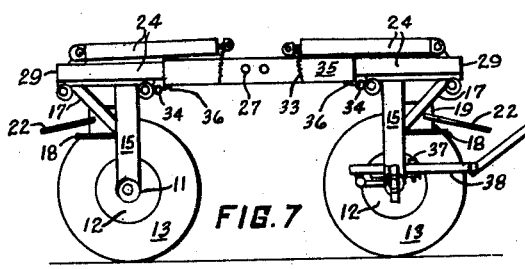
FIG. 7
INVENTOR
E. HUGHES TALBERT
BY
ATTORNEY United States Patent Office 3,156,484
Patented Nov. 10, 1964

3,156,484
ELEVATING AND TRANSPORTING DEVICE
Elmer Hughes Talbert, P.O. Box 482, Georgetown, Del.
Filed Jan. 12, 1962, Ser. No. 165,750
2 Claims. (Cl. 280—35)

The present invention relates to a transporting device which can be readily attached to certain loads, such as specially fitted box units, large shipping containers, electronic shelters and van bodies, and which will facilitate the elevation, movement and transportation of such loads for short or long distances, over roads or relatively unimproved terrain.

Objects of the present invention are as follows:

To provide, with a combination of devices, means for adapting certain loads, such as box units, large shipping containers, electronic shelters and van bodies to permit the unique attachment of the transporting device of this invention.

To provide, with combination of devices, means for quickly and easily attaching to certain loads, such as specially adapted box units, large shipping containers, electronic shelters and van bodies, for the purpose of elevating and transporting such loads.

To provide, with a combination of devices, means of elevating and lowering said certain loads after the transporting device of this invention has been suitably attached thereto.

To provide, with a combination of devices, means of transporting said certain loads, behind a towing vehicle, after the transporting device of this invention has been suitably attached thereto, and elevation of said certain loads has been accomplished.

To provide, with a combination of devices, means whereby the elevation of the bottom of said certain load can be quickly and easily changed from its position of normal transport for short distances of travel, while the transporting device of this invention remains attached to said certain load, in order to negotiate and clear ramps, humps or other obstructions.

To provide, with a combination of devices, means of removing certain elements of the transporting device of this invention, in order to reduce the total width of the combined load and attached said transporting device, after said transporting device has been attached to said certain loads and elevation thereof has been accomplished.

To provide, with a combination of devices, means whereby the wheel assemblies of the transporting device can be completely under said certain load in transporting position with no part of said transporting device except the towing bar, projecting beyond the front or the rear of said certain load.

To provide, with a combination of devices, means of attaching to, elevating and transporting said certain loads which permit selection and utilization of various types of conventional jacking devices, including but not limited to pneumatic, hydraulic and mechanical jacks.

To provide, with a combination of devices, means of attaching to, elevating and transporting said certain loads which permit selection and utilization of various types, forms and sizes of conventional suspension devices, including but not limited to, coil springs, air or hydraulic suspension, rubber mounting, torsion suspensions, platform springs, or any combination of the above, with or without shock absorbers and with conventional linkage.

To provide, with a combination of devices, means of attaching to, elevating and transporting said certain loads which permit selection and utilization of various types, forms and sizes of brake systems, including but not limited to, air, hydraulic, air over hydraulic, mechanical, electric, or any combination of the above, when such systems are a necessary integral accessory on the transporting devices.

To provide, with a combination of devices, means of attaching to, elevating and transporting said certain loads which permit selection and utilization of conventional steering systems and devices.

To provide, with a combination of devices, means for towing the transporting device of this invention when it is not attached to any load.

The above and other objects and attending advantages of the present invention will be apparent upon consideration of the following description when made in conjunction with the accompanying drawings wherein similar reference characters refer to similar parts throughout the several views and in which:

FIG. 1 is a side view of a part of a specially adapted box unit, with integral skid rails, to which a transporting device of this invention has been attached, wherein solid lines show said transporting device attached to said box unit prior to the commencement of elevation, and wherein dash lines show relative positions of said box unit and the attached transporting device during the process of elevation and in final position and ready for transporting.

FIG. 2 is a rear view of said box unit, with said rear unit of said transporting device attached, after elevation has been accomplished and rear of said box unit is ready for transporting.

FIG. 3 is a top view of a rear unit of said transporting device, wherein the right vertical elevating jack is shown folded against and locked to right positioning jack, and wherein both left jacks and their hydraulic lines have been removed.

FIG. 4 is a detail drawing of a typical connection for attaching a positioning jack to the carrier frame of the transporting device of this invention.

FIG. 5 is a detail drawing of a typical device installed on a box unit for the specific purpose of having said transporting device attached thereto, and a typical connection for accomplishing said attachment to a positioning jack.

FIG. 6 is a detail drawing of a part of the skid rail of a box unit, a skid rail carrier and a typical connection for attaching the two aforesaid elements.

FIG. 7 is a side view of both front and rear units of the transporting device of this invention, with said both units fastened together with an empty transport locking bar for towing while not loaded, and wherein the near wheels of said transporting device are shown removed to show additional details.

FIG. 8 is a detail drawing of an empty transport locking bar.

The present invention is illustrated in these various figures as comprising an elevating and transporting system for loads such as box units, electronic shelters, large shipping containers and van bodies, which said loads have been specially fit and adapted to permit attachment of other parts of said present invention.

The invention is comprised of front and rear units which are identical except that the front unit is equipped with a conventional steering device 38 as is shown in FIG. 7. Each unit includes two demountable elevating jacks 24, two demountable positioning jacks 29, suitable carriers such as the two skid rail carriers 14, cross members 16, suitable braces 17, a shelf or carrier 18 to hold one or more pumps or their equivalent 19, hydraulic lines and hoses or their equivalent 23, two struts or supports or their equivalent in the form of a suspension 15, an axle 11 assembly including hubs, wheels 12, tires 13 and brakes if required, fittings for box units and similar loads 4, an empty transport locking bar 35 and miscellaneous pins, fittings and other hardware.

Before the transporting device of this invention can be used, the box unit, electronic shelter, large shipping container, van body or similar load must be adapted to permit attachment of said device. When top corner lift rings are present on said loads, they may serve as top attachments. When top corner lift rings are not available, top attachments as well as bottom attachments must be installed on said loads.

A typical form of such attachment 4 is shown in FIG. 5 and it is understood that any other suitable, conventional form of attachment may be employed for this use, both as top attaching points and bottom attaching points, provided, however, that no part of said attachment projects beyond said load in the direction of its width, it being well understood that many loads of the nature described are already of full legal width for transporting purposes. It is also understood that inserts, retractable pins, threaded holes and similar devices are intended as possible means of attachment to said loads by this transporting device. Skids rails 2 are illustrated on the adapted box unit 1 in the several figures, and it is also intended that similar loads without skid rails may be adapted for use with this transporting device.

To attach and use this transporting device, a front or a rear unit is first pushed close against one end of an adapted box unit 1, or similar load, with the connecting ends 25 of the positioning jacks 29 pointing to the opposite end. In the case of front units, the steering lock pin 37 must be in place to temporarily lock the steering device to prevent steering movement of the front wheels.

When the transporting device is in position the positioning jacks 29 can be extended by the necessary manual or power operation, it being intended that pneumatic, mechanical or electrical jacks may be used although a hydraulic jack and system is illustrated, and it being further intended that jacking may be done manually or by power sources. With the positioning jacks 29 extended, they can be attached on both sides of the load by their ends 25 to the box unit fasteners 4 with pins 27 and as shown in FIG. 5.

The elevating jacks 24, which are normally strapped to the positioning jacks 29, when not in use, can have straps 33 removed and can be manipulated until their ends 25 can be attached to the upper box unit fasteners 3 with pins 27, on both sides of the box. The elevating jacks 24 shown are of the telescoping, multiple-section type to fit the load illustrated, but this is not intended to limit the use of other types for this purpose. The positioning jacks 29 are intended to be double-acting only, that is to say, to exert a force both for pulling and for pushing.

With all four jacks in place, reference to FIG. 1, will make it evident that as the elevating jacks 24 are extended, the end of the load attached will be lifted from the ground. When said load has been raised to the point that the skid rails 2 of the box unit 1 are higher than the skid rail carriers 14 on the transporting device, use of the elevating jacks 24 can be discontinued and the positioning jacks 29 can be used to pull the transporting device under said box unit 1 until the skid rail carrier 14 is approximately in place. Alternate use of both pairs of jacks will then permit alignment of holes in the skid rail carrier 14 and in the skid rails 2 until pins 7 can be inserted to lock transporting device to the adapted box unit 1, as shown in FIG. 6, it being well understood that the drilling, casting or making of holes in said skid rails 2 constitutes a further adaptation of said certain loads identified.

It is also intended and understood that other conventional fasteners may be substituted for those illustrated and that carriers of a different pattern than shown in FIG. 6 are within the intent of this invention. The use of dowels, inserts, tapped holes and similar devices is contemplated to accommodate loads of varying natures, types and sizes.

After one end of said box unit 1 has had the transporting device attached, has been elevated and has been locked to said transporting device, the procedure previously delineated can be repeated with the remaining unit of the transporting device on the other end of said box unit. If it is considerably more desirable, two crews may be employed to attach transporting devices to and to elevate both ends of said box unit simultaneously. It is understood that the process described is essentially reversible to lower the box unit 1 and detach the transporting device.

After the box unit 1 is completely elevated and locked to both front and rear transporting device units, the steering lock pin 37 can be removed and the load, now in the form of a full trailer may be towed as desired. If the combined load and transporting device is too wide for existing conditions, the four jacks can be simply and easily removed. The hydraulic lines 23 will normally be connected with conventional breakaway fittings to permit easy removal of said lines. After the lines 23 are removed all four jacks can be taken off of the transporting device by the removal of ten pins. With said jacks removed, it is obvious by reference to FIG. 2 that no part of the transporting device will extend beyond a pre-determined point, usually the width of the load.

Circumstances of use may occasionally make it desirable to be able to change the elevation of the load being transported in order to negotiate and clear ramps, humps and overhead obstructions. For short distances and at slow speeds, to accomplish this, both transporting units can be unlocked from the adapted box unit and the positioning jacks can be used to push the axle and wheel assembly and related elements from under said box unit. After the wheels are completely clear of said box unit, further reference to FIG. 1, shows that the elevating jacks can be used to support the box unit through a wide range of elevations with complete stability at slow speeds.

To move the transporting device by towing when it is not loaded the front and rear units are connected on both sides with an empty transport locking bar 35. The same pins 27, used to fasten the ends 25 of the positioning jacks 29 are inserted through said ends 25 and through matching holes in the locking bar. The flanges on the locking bar fit over front and rear positioning jacks thereby achieving the locking action. The fastening of stay chains 36 to rings 34 is a safety precaution to prevent accidental extension of the positioning jacks during empty transport.

While this invention has been shown and described herein with considerable particularity, it will be readily understood by those skilled in the art that other modifications may be resorted to without departing from the spirit of the invention. Reference will therefore be had to the appended claims for a definition of the limits of this invention.

What is claimed is:

1. A transporter system for elevating, supporting and transporting a body unit over a supporting surface, comprising a front transporter unit and a rear transporter unit for respective attachment to the front and rear of the body unit, each of said units comprising a frame assembly provided with a supporting wheel assembly, a pair of elevating jacks having their lower ends detachably connected with said frame assembly, means for detachably connecting the upper ends of said jacks to the upper portion of said body unit, a pair of positioning jacks having respective ends thereof detachably connected with the frame assembly and having the opposite ends thereof detachably connected with the body unit at the bottom of the latter and between the front and rear thereof, means for extending said elevating jacks to raise the body unit to a position where the bottom thereof is at substantially the same elevation as said frame assembly, means for collapsing said positioning jacks to bring said frame assembly into supporting position beneath the bottom of said body unit, and means for attaching the frame assembly to the bottom of said body unit, whereby the latter may be readily transported over the supporting surface.

2. A transporter system as set forth in claim 1 wherein the bottom of the body unit is provided with a pair of spaced apart skid rails adjacent the front and rear of the unit, and each frame assembly is provided with a pair of skid rail carriers respectively connected with the skid rails.

References Cited in the file of this patent

FOREIGN PATENTS 872,432    Germany _____ Apr. 2, 1953